(12) United States Patent
Bosch et al.

(10) Patent No.: US 11,012,251 B2
(45) Date of Patent: May 18, 2021

(54) MULTICAST FLOW SCHEDULING IN A DATA CENTER

(71) Applicant: Cisco Technology, Inc., San Jose, CA (US)

(72) Inventors: Hendrikus G. P. Bosch, Aalsmeer (NL); Sape Jurriën Mullender, Amsterdam (NL); Ijsbrand Wijnands, Leuven (BE); Alessandro Duminuco, Milan (IT); Jeffrey Michael Napper, Delft (NL); Subhasri Dhesikan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 19 days.

(21) Appl. No.: 16/149,756

(22) Filed: Oct. 2, 2018

(65) Prior Publication Data
US 2020/0106631 A1 Apr. 2, 2020

(51) Int. Cl.
*H04L 12/18* (2006.01)
*H04L 12/801* (2013.01)
(Continued)

(52) U.S. Cl.
CPC .......... *H04L 12/1881* (2013.01); *H04L 47/15* (2013.01); *H04L 47/6205* (2013.01); *H04L 49/201* (2013.01); *H04L 49/254* (2013.01)

(58) Field of Classification Search
CPC .............................. H04L 2/1881; H04L 47/15
See application file for complete search history.

(56) References Cited

U.S. PATENT DOCUMENTS 6,515,967 B1 2/2003 Wei et al.
7,688,741 B2 3/2010 Botton-Dascal et al.
(Continued)

FOREIGN PATENT DOCUMENTS

CN 102195788 A 9/2011

OTHER PUBLICATIONS

M. McBride, Huawei Technologies, "Multicast in the Data Center Overview", draft-ietf-mbonded-dc-deploy-00, Internet Engineering Task Force, Internet-Draft, Feb. 2013, https://tools.ietf.org/id/draft-ietf-mbonded-dc-deploy-00.html, 7 pages.
(Continued)

*Primary Examiner* — Angel T Brockman
(74) *Attorney, Agent, or Firm* — Edell, Shapiro & Finnan, LLC

(57) ABSTRACT

In one example embodiment, a server generates a candidate instantiation of virtual applications among a plurality of hosts in a data center to support a multicast stream. The server provides, to a first set of agents corresponding to a first set of the plurality of hosts, a command to initiate a test multicast stream. The server provides, to a second set of agents corresponding to a second set of the plurality of hosts, a command to join the test multicast stream. The server obtains, from the second set of agents, a message indicating whether the second set of agents received the test multicast stream. If the message indicates that the second set of agents received the test multicast stream, the server causes the virtual applications to be instantiated in accordance with the candidate instantiation of the virtual applications.

20 Claims, 6 Drawing Sheets

(51) Int. Cl.
  *H04L 12/863* (2013.01)
  *H04L 12/931* (2013.01)
  *H04L 12/937* (2013.01)

(56) References Cited

U.S. PATENT DOCUMENTS

| | | | |
|---|---|---|---|
| 9,426,072 | B2 | 8/2016 | Ratzin et al. |
| 9,755,952 | B2 | 9/2017 | Venkataswami et al. |
| 2009/0172180 | A1 | 7/2009 | Chiu et al. |
| 2010/0098077 | A1 | 4/2010 | Oertel |
| 2011/0286453 | A1 | 11/2011 | Venkataswami et al. |
| 2014/0237118 | A1 | 8/2014 | Matthews |
| 2016/0147549 | A1* | 5/2016 | Sivak .................. G06F 9/45558 718/1 |

OTHER PUBLICATIONS

"Professional Media Over Managed IP Networks: SMPTE ST 291-1 Ancillary Data", SMPTE ST 2110-40:2018, The Society of Motion Picture and Television Engineers, SMPTE Standard, Apr. 12, 2018, 8 pages.

"Professional Media Over Managed IP Networks: AES3 Transparent Transport", SMPTE ST 2110-31:2018, SMPTE Standard, The Society of Motion Picture and Television Engineers, Jul. 27, 2018, 12 pages.

"Professional Media Over Managed IP Networks: PCM Digital Audio", SMPTE ST 2110-30:2017, The Society of Motion Picture and Television Engineers, SMPTE Standard, Sep. 18, 2017, 9 pages.

"Professional Media Over Managed IP Networks: Traffic Shaping and Delivery Timing for Video", SMPTE ST 2110-21:2017, The Society of Motion Picture and Television Engineers, SMPTE Standard, Nov. 22, 2017, 17 pages.

"Professional Media Over Managed IP Networks: Uncompressed Active Video", SMPTE Standard, SMPTE ST 2110-20:2017, The Society of Motion Picture and Television Engineers, Sep. 18, 2017, 22 pages.

"Professional Media Over Managed IP Networks: System Timing and Definitions", SMPTE Standard, SMPTE ST 2110-10:2017, The Society of Motion Picture and Television Engineers, Sep. 18, 2017, 17 pages.

"Transport of High Bit Rate Media Signals over IP Networks (HBRMT)", SMPTE Standard, SMPTE ST 2022-6:2012, The Society of Motion Picture and Television Engineers, Oct. 9, 2012, 16 pages.

International Search Report and Written Opinion in counterpart International Application No. PCT/US2019/052843, dated Nov. 27, 2019, 14 pages.

Edwards, Thomas G. et al., "Using SDN to Facilitate Precisely Timed Actions on Real-Time Data Streams", HotSDN'14, Aug. 22, 2014, 5 pages.

\* cited by examiner

MULTICAST FLOW SCHEDULING IN A DATA CENTER

TECHNICAL FIELD

The present disclosure relates to multicast technology.

BACKGROUND

Today, the professional media industry (e.g., film, linear television, radio, visual radio, etc.) uses bespoke physical appliances for managing/distributing audio and video signals in production studio data centers. These bespoke appliances are networked by way of Synchronous Digital Interface (SDI) networks to carry audio and video signals between those appliances. SDI does not provide for a network protocol, and carries only digitized analog signals. For interconnecting appliances, SDI routers are programmed to patch incoming signals to outgoing signals to route the audio and video signals across, between, and through production studios. SDI routing is external and not native to the SDI standard.

SDI is presently being replaced by Internet Protocol (IP) networks. SDI samples are packaged into User Datagram Protocol (UDP) and/or Real-time Transport Protocol (RTP) packets and sent from a source to one or more sinks by way of IPv4-based multicast trees. As used herein, the term "SDI-over-IP" may refer to SDI converted to IP by encapsulation or similar techniques as well as native IP streams that replace SDI. In SDI-over-IP, every media source (e.g., camera, microphone, etc.) is assigned a private multicast tree and media receivers simply subscribe to the multicast trees to receive a feed. SDI gateways and IP-based sources feed packet streams into the multicast trees. SDI-over-IP streams are typically elephant multicast flows with data rates between 1.5 Gb/s (e.g., for high-definition video) and 12 Gb/s (e.g., for high dynamic range or ultra high-definition video) for uncompressed video. Since signal quality is key (i.e., packet loss and blocking are not acceptable), specialized professional media networks are programmed to ensure that a non-blocking, loss-free transmission of the SDI-over-IP signals exists between ingress devices, physical appliances, and egress devices in data centers for such multicast trees.

To ensure professional media networks can support all of the SDI-over-IP-based media multicast flows, network schedulability analysis is traditionally performed by a Software Defined Network (SDN) controller in the professional media network. The SDN controller only admits new streams if (a) existing flows are not disrupted and (b) the new flows in combination with the existing flows can meet their real-time requirements.

DESCRIPTION OF EXAMPLE EMBODIMENTS

Overview

Figure 1:
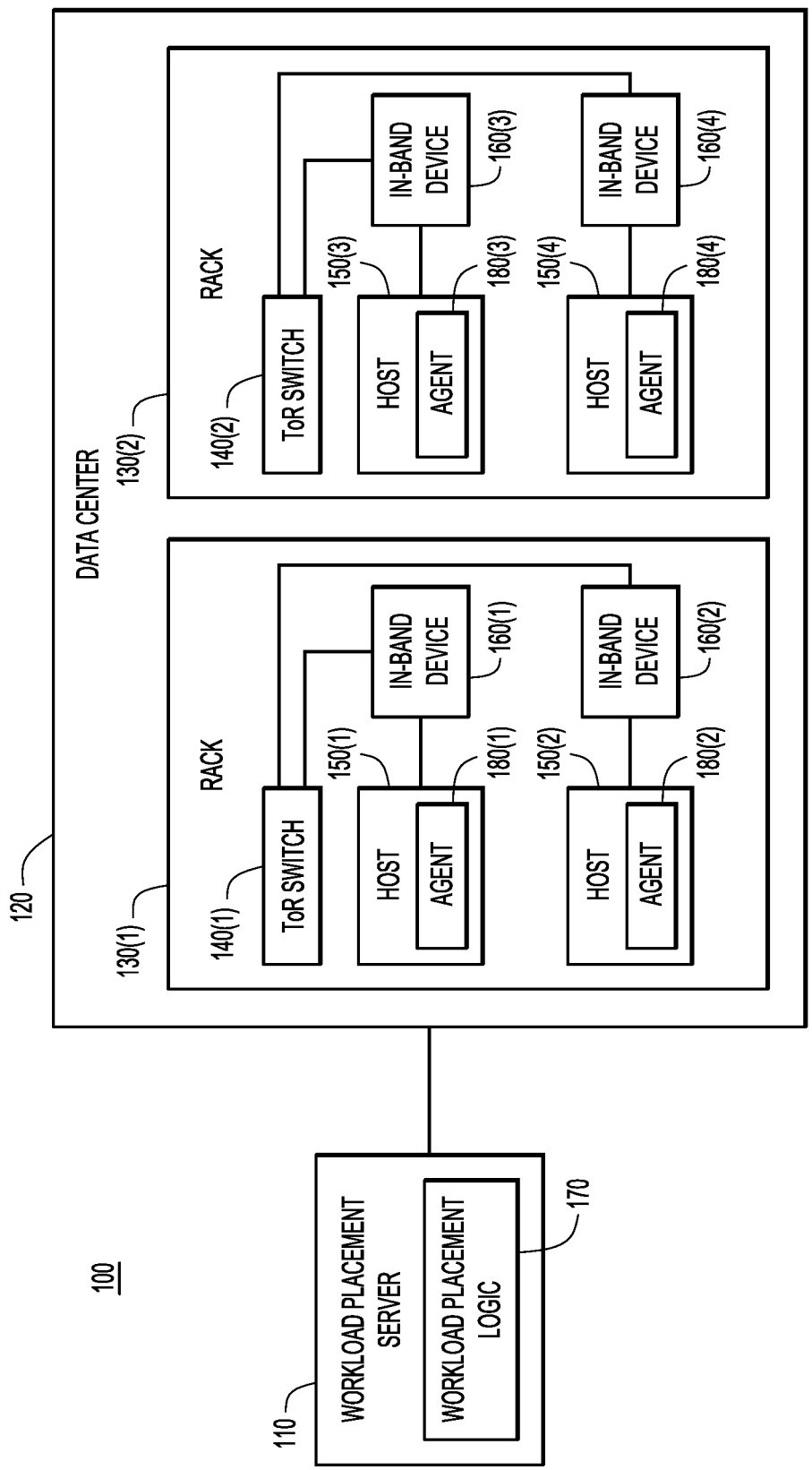
FIG. 1 illustrates a system with multicast scheduling agents deployed on hosts in a data center, according to an example embodiment.

In one example embodiment, a server generates a candidate instantiation of virtual applications among a plurality of hosts in a data center to support a multicast stream. The server provides, to a first set of agents corresponding to a first set of the plurality of hosts, a command to initiate a test multicast stream. The server provides, to a second set of agents corresponding to a second set of the plurality of hosts, a command to join the test multicast stream. The server obtains, from the second set of agents, a message indicating whether the second set of agents received the test multicast stream. If the message indicates that the second set of agents received the test multicast stream, the server causes the virtual applications to be instantiated in accordance with the candidate instantiation of the virtual applications.

Example Embodiments

One shift that is taking place in the professional media industry is that bespoke physical appliances (e.g., specific network elements such as x86-based computers, specialized hardware to manage flows, etc.) in professional media data centers are being replaced with virtualized applications (e.g., processes, containers, virtual machines, bare-metal services hosted on traditional data center hardware and managed by a cloud-management system, etc.). Scheduling for Synchronous Digital Interface (SDI)—over—Internet Protocol (IP) streams for bespoke physical appliances involves ensuring that there is enough bandwidth available between ingress, appliance, and egress network ports in the data center. Virtualized applications increase the complexity of this schedulability analysis because such applications can be dynamically deployed on a wide variety of data center equipment (e.g., computers/servers/hosts), each of which is connected via a different network switch port and/or network switch.

Thus, schedulability analysis must take into account where the virtualized application is (or will be) hosted to ensure that the real-time requirements of any new flows as well as the existing flows can be met. The schedulability analysis must further ensure that the selected data center equipment can support the computational and storage requirements of the virtualized application(s). The exact placement of virtualized applications depends on the properties and availability of data center equipment as well as on the scheduling of data flows. At the same time, however, data flows cannot be scheduled until the placement of the flow-producing/consuming virtualized applications is known. Thus, the professional media industry is faced with a chicken-and-egg problem as to the schedulability/placement of virtualized applications in data center equipment.

Furthermore, scheduling these virtualized applications is typically jointly managed by a cloud system (and more specifically, a cloud manager's placement function) and a network centralized Software Defined Networking (SDN) controller. This requires the SDN controller to know the precise state of the network. However, there are many cases where multicast stitching for elephant flows is only performed during Internet Group Management Protocol (IGMP)/Protocol Independent Multicast (PIM) processing. In these cases, the SDN controller does not make bandwidth reservations as the switches themselves reserve bandwidth during IGMP/PIM processing. As such, there is no a single, centralized element where all network scheduling information is retained to aid the virtualized application placement in the data center. In other words, an SDN controller is not dependable for resource reservation in the IGMP/PIM context.

In addition, scheduling decisions can only be made when participating switches receive PIM (IGMP) join messages through a switch network interface to initiate the scheduling procedure. Starting virtualized professional media applications on a data-center host may take minutes per placement decision, and configuring virtualized applications and physical appliances requires the professional media workflows to be executed for every data center placement function, which changes operations in professional media studios. Given the time required to deploy virtualized applications in cloud environments (e.g., minutes), the appliance/application configuration that is needed to initiate an IGMP join message, and the number of possible combinations for deploying virtualized solutions using IGMP join messages sent by the virtualized application and/or physical appliances (once configured) to test out of deployment of a solution is an undesirable solution.

FIG. 1 illustrates a system 100 for scheduling multicast flows. In one example, system 100 is located on-site at a professional media studio. System 100 includes workload placement server 110 in communication with data center 120. Data center 120 includes racks 130(1) and 130(2). Rack 130(1) houses Top-of-Rack (ToR) switch 140(1), hosts (e.g., servers) 150(1) and 150(2), and in-band devices (e.g., transceivers such as Ethernet small-form-factor pluggable transceivers (SFPs), external switches such as external Ethernet switches, etc.) 160(1) and 160(2). Rack 130(2) houses ToR switch 140(2), hosts 150(3) and 150(4), and in-band devices 160(3) and 160(4). ToR switch 140(1) may manage/monitor hosts 150(1) and 150(2) via in-band devices 160(1) and 160(2), and ToR switch 140(2) may manage/monitor hosts 150(3) and 150(4) via in-band devices 160(3) and 160(4). In one example, ToR switches 140(1) and 140(2) are leaf nodes in a spine-leaf architecture. It will be appreciated that data center 120 may include any suitable number of racks, and individual racks may house any suitable number of ToR switches, hosts, and in-band devices.

Data center 120 may manage/distribute media (e.g., digitized video or audio) elephant multicast streams/flows for a professional media studio. The media elephant multicast flows may be compressed or uncompressed, and may use any suitable standard (e.g., Society of Motion Picture and Television Engineers (SMPTE) timecode, H.264, Joint Photographic Experts Group (JPEG) 2000 (J2K), NewTek™'s Network Device Interface (NDI™), etc. In order to manage/distribute these flows, data center 120 may utilize various virtualized applications. The virtualized applications may run on one or more of hosts 150(1)-150(4).

Workload placement server 110 utilizes workload placement logic 170 in order to determine proper workload placement for the virtualized applications (e.g., at which hosts 150(1)-150(4) the various virtualized applications should be placed). Briefly, workload placement logic 170 causes workload placement server 110 to communicate with agents 180(1)-180(4) deployed on hosts 150(1)-150(4), respectively, to help establish test/synthetic multicast trees to determine the viability of a given virtualized application. Agents 180(1)-180(4) assume the role of the virtual applications (and/or physical appliances) during workload placement and establish test multicast trees before the actual virtual applications (and/or physical appliances) are deployed/configured.

More specifically, workload placement server 110 may generate a candidate instantiation of virtual applications among hosts 150(1)-150(4) to support a multicast stream. Workload placement server 110 may provide, to a first set of agents (e.g., agent 180(1)) corresponding to a first set of the plurality of hosts (e.g., host 150(1)), a command to initiate a test multicast stream. Workload placement server 110 may provide, to a second set of agents (e.g., agents 180(2)-180(4)) corresponding to a second set of the plurality of hosts (e.g., hosts 150(2)-150(4)), a command to join the test multicast stream. Workload placement server 110 may obtain, from the second set of agents (directly or indirectly), a message indicating whether the second set of agents received the test multicast stream. If the message indicates that the second set of agents received the test multicast stream, workload placement server 110 may cause the virtual applications to be instantiated in accordance with the candidate instantiation of the virtual applications. If the message indicates that the second set of agents did not receive the test multicast stream, workload placement server 110 may generate another candidate instantiation of virtual applications to support the multicast stream.

Unlike conventional approaches, workload placement logic 170 allows data center 120 to rapidly test various workload placements without actually deploying and configuring virtual applications and/or physical appliances. This helps avoid the chicken-and-egg problem faced by traditional systems. Moreover, workload placement logic 170 does not require a centralized SDN controller when placing virtualized applications. This aligns with decentralized elephant multicast flow scheduling.

Figure 2:
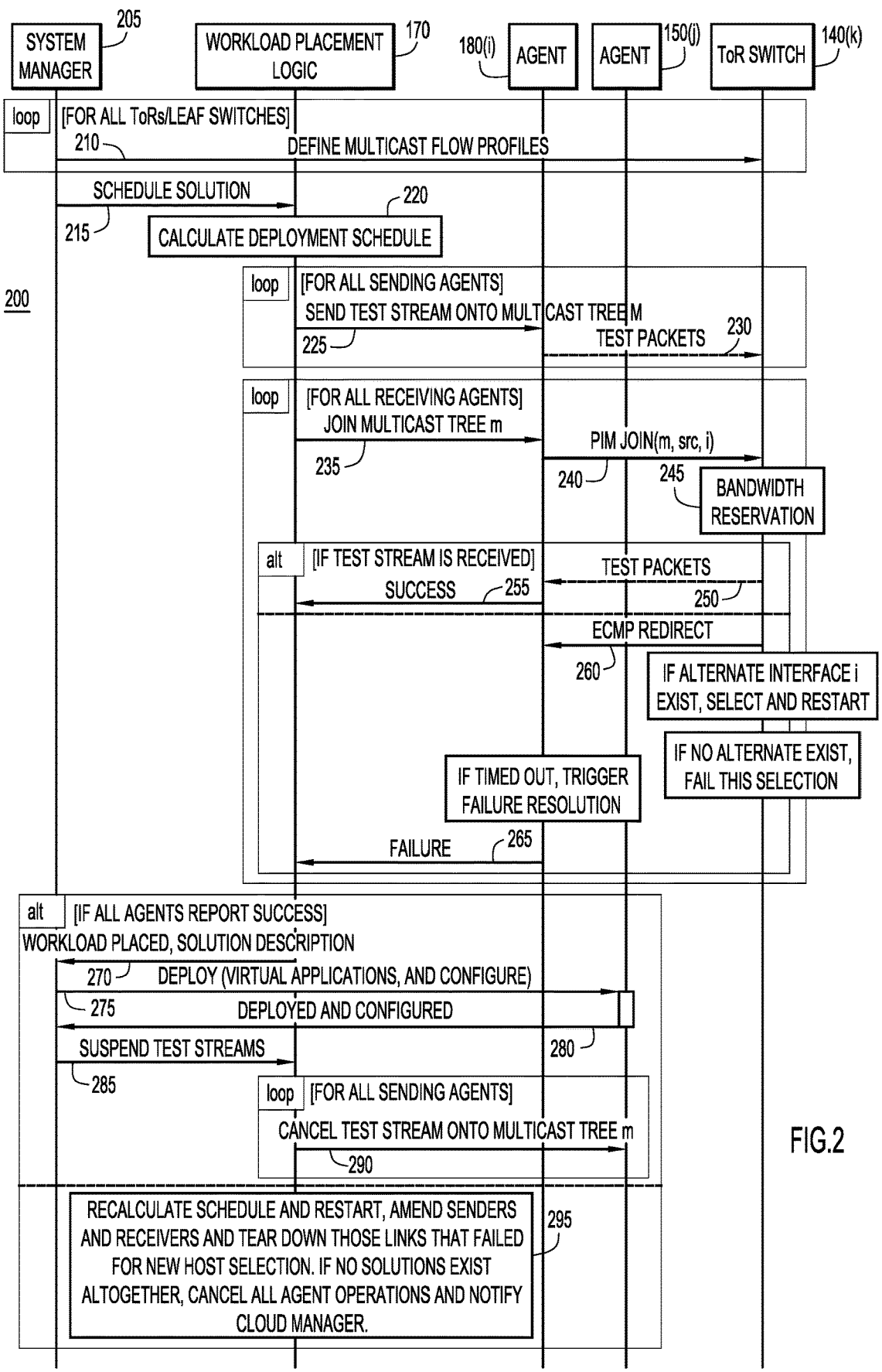
FIG. 2 illustrates a call flow for scheduling multicast flows in a data center, according to an example embodiment.

FIG. 2 illustrates an example call flow (sequence) diagram 200 for workload placement. The call flow is between system manager 205, workload placement logic 170, one or more agents 180(i), one or more hosts 150(i), and one or more ToR switches 140(k). System manager 205 may be a broadcast controller, cloud manager, or any other functional element that is used to craft professional-media solutions. In one example, system manager 205 may be logic that exists on workload placement server 110. Workload placement logic 170 may be a function called by system manager 205 to find a deployment for a professional-media solution with virtualized applications using test multicast flows in a data center. Agent 180(i) may be an application on a host running as a container, process, virtual machine, etc. Host 150(j) may be a computer/server used to run the virtualized application, and may carry the agent. ToR switch 140(k) may be used for carrying the multicast flows, and processing PIM and IGMP signaling for multicast tree management.

Briefly, as workload placement logic 170 makes placement decisions for solution components (virtualized applications), workload placement logic 170 needs to interact with the network to assess whether the network can carry the requested elephant multicast flows. To make this assessment, workload placement logic 170 may instruct each of the agents 180(i) representing hosts 150(j) where the solution components are to be deployed to sign onto or originate the multicast trees needed for the solution by following the proper PIM (IGMP) join procedures with ToR switch 140(k). This applies for all virtual applications and/or physical appliances. By testing out flows for the entire end-to-end solution, even by synthesizing "fake" traffic onto multicast trees, workload placement logic 170 may quickly decide which solution deployments work and which do not. Thus, placement decisions may be made without explicitly interacting with a centralized SDN controller.

At 210, system manager 205 signals, to all participating ToR switches 140(k), the bandwidth required for all of the multicast flows that need to be managed by data center 120. This indicates to ToR switches 140(k) the bandwidth requirements of each of the multicast trees that can potentially be placed thereon. Since all ToR switches 140(k) are notified of the bandwidth requirements, each ToR switch 140(k) can independently make its own scheduling decisions when asked to carry an elephant flow for a multicast tree during IGMP/PIM processing.

At 215, system manager 205 carries a description of the workload solution that needs to be placed including all virtualized applications that need to be scheduled, physical appliances that need to be connected, and multicast trees that are available between the various functional elements. This description may be integrated with a (e.g., multi-cloud) scheduler or may be run as an independent functional element. At 220, workload placement logic 170 may generate one or more candidate instantiations of virtual applications while accounting for compute, memory, and storage capacity of hosts 150(j) (e.g., in one or more cloud systems) to schedule the virtual applications. Scheduling such workloads is a challenging problem.

At 225, workload placement logic 170 signals to all sending agents 180(i) (which may be a subset of all agents 180(i)) to set up and initiate a multicast tree for the workload in accordance with the previously generated candidate instantiation. Workload placement logic 170 may include an indication of a port that is unique to the test multicast stream (e.g., a predetermined User Datagram Protocol (UDP) port or a free UDP port to be associated with the multicast tree). In this example, workload placement logic 170 has already determined that there is bandwidth between ToR switch 140(k) and host 150(j), and therefore creating a sender for a test multicast stream is successful.

At 230, all sending agents 180(i) start transmitting/sending test multicast streams to corresponding ToR switches 140(k). Because sending agents 180(i) are configured before any receiving agents 180(i) (which may also be a subset of all agents 180(i)), all multicast traffic is temporarily discarded by the ToR switches 140(k) given the absence of forwarding information.

At 235, workload placement logic 170 instructs receiving agents 180(i) to join respective multicast trees. At 240, this causes receiving agents 180(i) to send a PIM join control message for the selected multicast trees. At 245, ToR switches 140(k) allocate one or more bandwidth reservations in accordance with operation 210 in order to stitch the multicast trees together.

Operation 250 depicts the case where a receiving agent 180(i) starts receiving the test packets sent at 230. In this case, at 255, the receiving agent 180(i) may inform workload placement logic 170 of the successful stitching/joining of the test multicast tree, thereby completing partial placement. Operation 260 depicts the case where a sending agent 180(i) receives an Equal Cost Multipath (ECMP) redirect message from ToR switch 140(k). This prompts sending agent 180(i) to search for another interface at which to receive a new PIM (IGMP) join message to restart the call flow at 240. PIM is used in the example of FIG. 2 because ECMP redirects may be used to select alternate interfaces if the selected interface cannot support the test elephant multicast flow (operation 260). However, it will be appreciated that other standards/protocols, such as IGMP, may also/alternatively be used.

When sending agent 180(i) is requested to originate a multicast tree, that agent 180(i) may synthesize multicast traffic by posting placeholder/synthesized packets to the multicast tree. This addresses the absence of acknowledgments in the IGMP and PIM protocols, as join messages are not acknowledged. In particular, reception of these placeholder packets by the receiving agents 180(i) may be interpreted as an implicit acknowledgement that the multicast tree may be created as specified. To make certain that synthesized traffic does not interfere with application traffic, the sending agents 180(i) may use a private UDP port for the selected multicast addresses such that the network itself ignores the UDP port numbering in the network stitching process.

In one example, after sending the indication of success at 255, receiving agents 180(i) may become new sending agents 180(i) which send test packets to additional receiving agents 180(i). Additional receiving agents 180(i) may then become further new sending agents 180(i) which send test packets to further additional receiving agents. This process may iterate until all agents 180(i) have successfully joined the multicast stream.

At 265, if no more interfaces exist, or if a timeout has occurred (e.g., a set length of time for a receiving agent 180(i) to receive a test packets has expired), receiving agent 180(i) may send a failure indicator to workload placement logic 170. The timeout may be configured on a case-by-case basis that is specific to the professional media network at issue. When workload placement logic 170 receives the failure responses, workload placement logic 170 may decide to schedule a part of the workload elsewhere. When this happens, workload placement logic 170 may restart the workload placement test by reiterating the procedure beginning at operation 225 for the updated placement.

Operation 270 depicts the case where a solution has been completely and successfully placed. In this case, workload placement logic 170 informs system manager 205 of the successful establishment of all the multicast trees. This causes, at 275, system manager 205 to instantiate the virtual applications on the data center hosts 150(j) in accordance with the candidate instantiation of the virtual applications. System manager 205 deploys the virtual applications and configures each of the virtual applications and physical appliances with respective settings. The applications and appliances start and join respective multicast trees to establish the end-to-end multicast solution.

At 280, all applications and appliances are configured and operating, and the hosts 150(j) send a collection of messages to system manager 205 to indicate that the deployed solution has been successfully instantiated. At 285, system manager 205 indicates to workload placement logic 170 that the sending agents 180(i) should cease test messaging. At 290, workload placement logic 170 sends a message to all sending agents 180(i) to wind down issuing test packets and end participation in the test multicast trees. In an alternative embodiment, operations 285 and 290 may occur before or during operation 275. At 295, if there is no workload placement solution, workload placement logic 170 may completely recalculate a solution or notify system manager 205 of this event.

In the examples of FIGS. 1 and 2, an agent is run on every host in the data center where virtualized applications may be deployed. Agents may also be deployed on physical appliances (e.g., Ethernet ports used to produce or consume elephant multicast flows). However, there may be cases where certain hosts cannot accommodate agents (e.g., physical appliances, unsupported hypervisors, too computationally cumbersome, etc.). In these cases, the agent may be deployed on one or more ToR switches or in-band devices to act as proxies for the hosts. For example, in-band devices may host agents for dedicated devices (e.g., SDI gateways) that are unable to perform agent duties themselves. It will be appreciated that agents may be deployed on both hosts and various proxies (e.g., ToR switches and/or in-band devices) depending on the particular use case.

Figure 3:
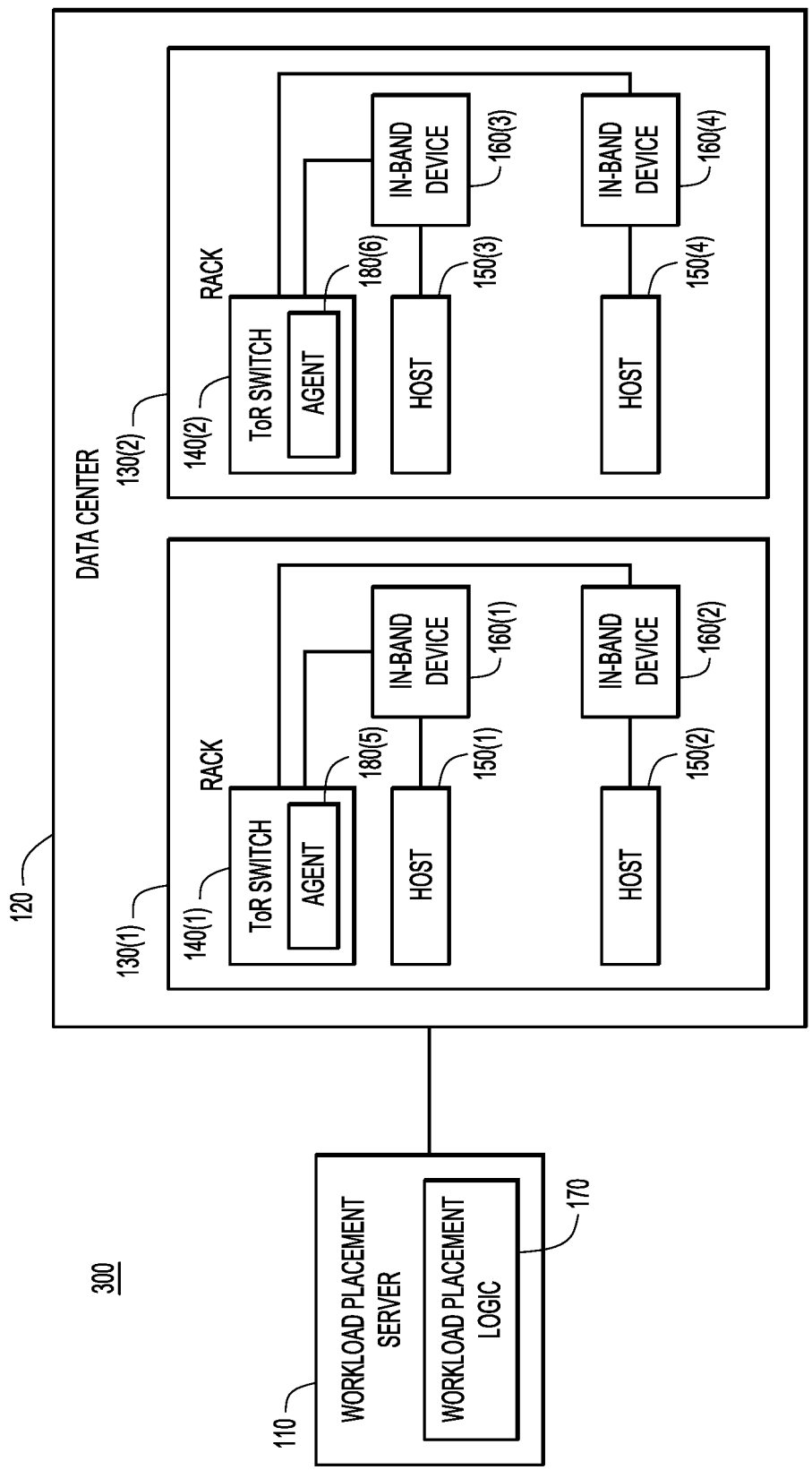
FIG. 3 illustrates a system with multicast scheduling agents deployed on Top-of-Rack (ToR) switches in a data center, according to an example embodiment.

FIG. 3 illustrates a system 300 for scheduling multicast flows. System 300 is similar to system 100, but instead of having agents 180(1)-180(4) deployed on hosts 150(1)-150(4), system 300 has agents 180(5) and 180(6) deployed on ToR switches 140(1) and 140(2), respectively. Agent 180(5), for example, may be maintained for the entirety of rack 130(1) (here, hosts 150(1) and 150(2)) if the link capacity of agent 180(5) exceeds that of the aggregate of all other ports in ToR switch 140(1) and if the link can be used as a shorthand/proxy for all other ports in ToR switch 140(1). ToR switch 140(1) speaks for all hosts in rack 130(1) (i.e., 150(1) and 150(2)), assuming the ToR switch implementation can be changed.

It will be appreciated that the ToR design in system 300 is merely an example, and that other data center designs may be used. One alternative, for example, is an End-of-Row (EoR) design in which an EoR switch manages/monitors a plurality of racks each housing a plurality of hosts. This is in contrast to the ToR design in which the ToR switch only manages/monitors hosts within a single rack. In this example, an agent may be deployed on an EoR switch to act as a proxy for the hosts in the racks to which the EoR switch is connected.

Figure 4:
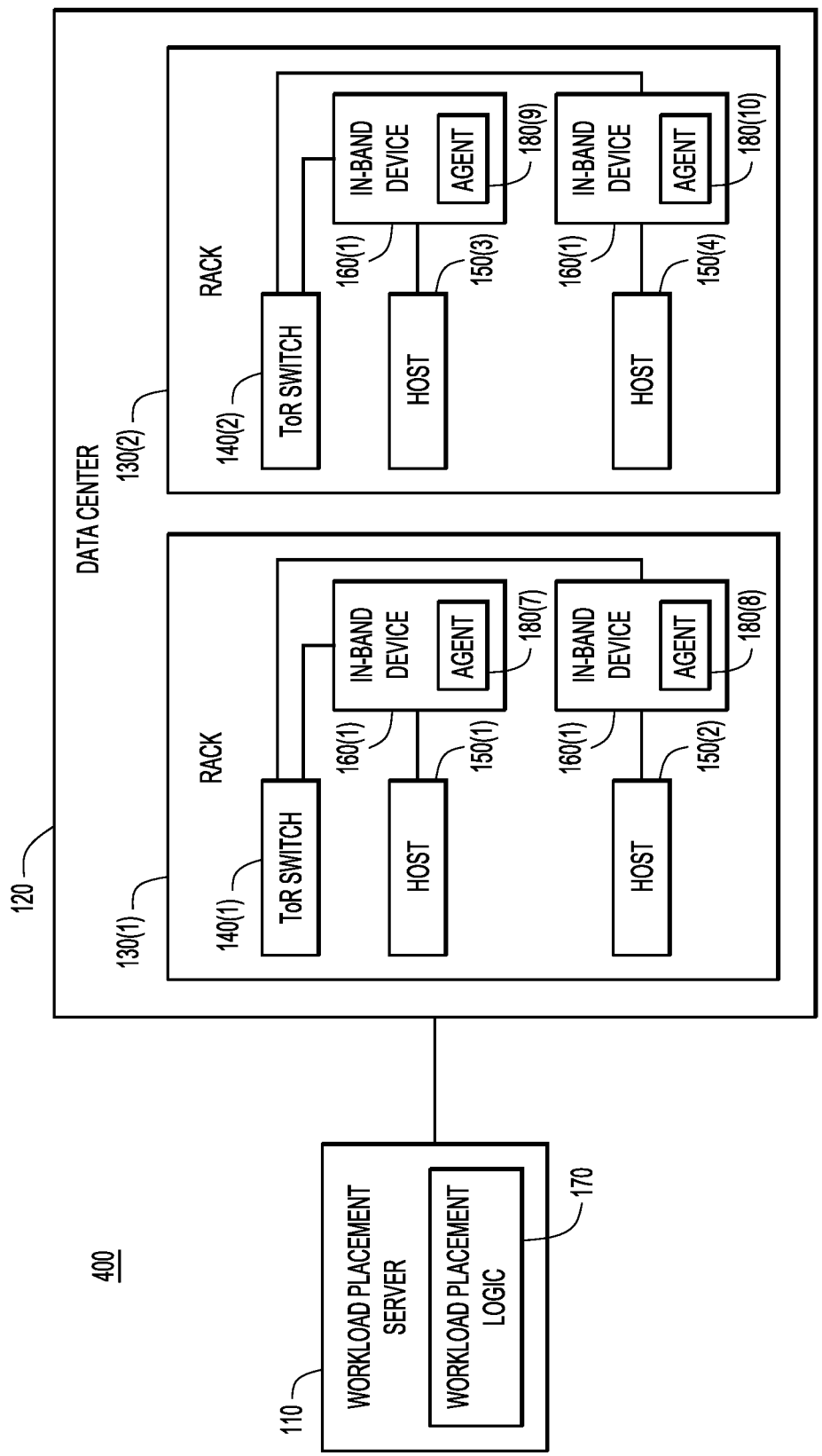
FIG. 4 illustrates a system with multicast scheduling agents deployed on in-band devices in a data center, according to an example embodiment.

FIG. 4 illustrates a system 400 for scheduling multicast flows. System 400 is similar to system 100, but instead of having agents 180(1)-180(4) deployed on hosts 150(1)-150(4), system 400 has agents 180(7)-180(10) deployed on in-band devices 160(1)-160(4), respectively. In a further example, agents may be deployed on respective in-band devices of a single host because multiple in-band devices may be required to proxy the host. For example, if host 150(1) had another in-band device in addition to in-band device 160(1), each in-band device may include a respective agent. This may be implemented by way of any suitable inter-in-band device control protocol (e.g., an inter-SFP device control protocol).

Figure 5:
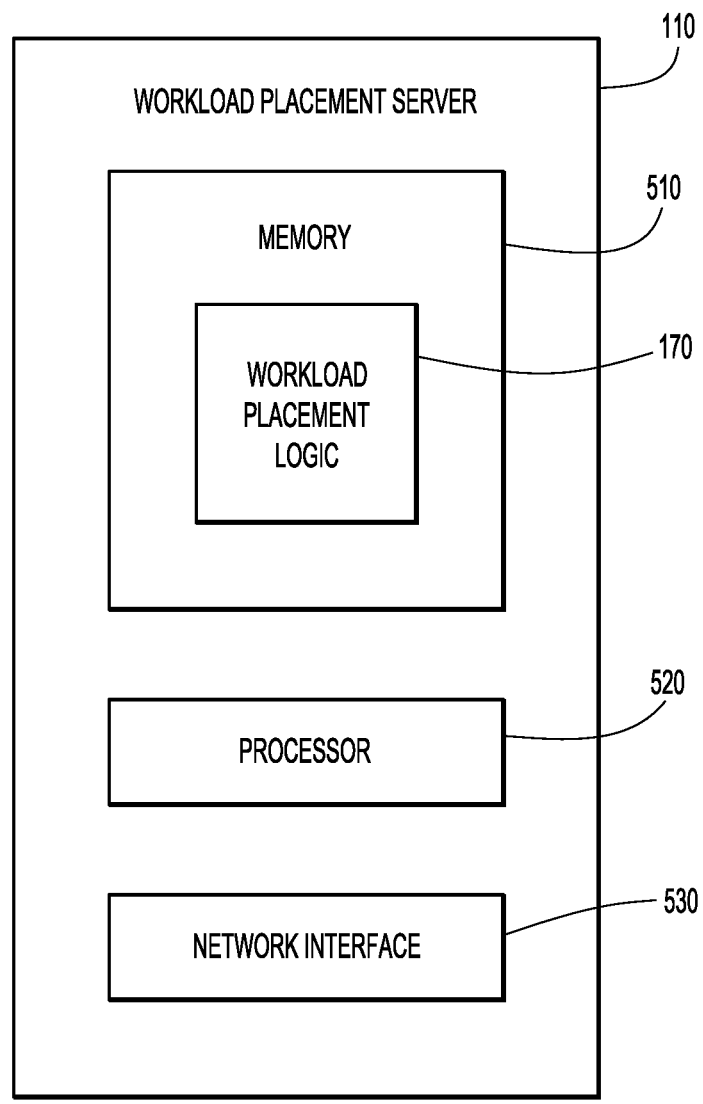
FIG. 5 is a block diagram of a computing device configured to perform multicast flow scheduling in a data center, according to an example embodiment.

FIG. 5 is a simplified block diagram of workload placement server 110 configured to implement techniques presented herein. In this example, the workload placement server 110 includes memory 510 that stores instructions for workload placement logic 170, one or more processors 520, and network interface 530. One or more processors 520 are configured to execute instructions stored in the memory 510 for workload placement logic 170. When executed by the one or more processors 520, workload placement logic 170 causes workload placement server 110 to perform operations described herein. Network interface 530 is a network interface card (or multiple instances of such a device) or other network interface device that enables network communications on behalf of workload placement server 110 for sending and receiving messages as described above.

Memory 510 may be read only memory (ROM), random access memory (RAM), magnetic disk storage media devices, optical storage media devices, flash memory devices, electrical, optical, or other physical/tangible memory storage devices. Thus, in general, memory 510 may be one or more tangible (non-transitory) computer readable storage media (e.g., a memory device) encoded with software comprising computer executable instructions and when the software is executed (by processor 520) it is operable to perform operations described herein.

Figure 6:
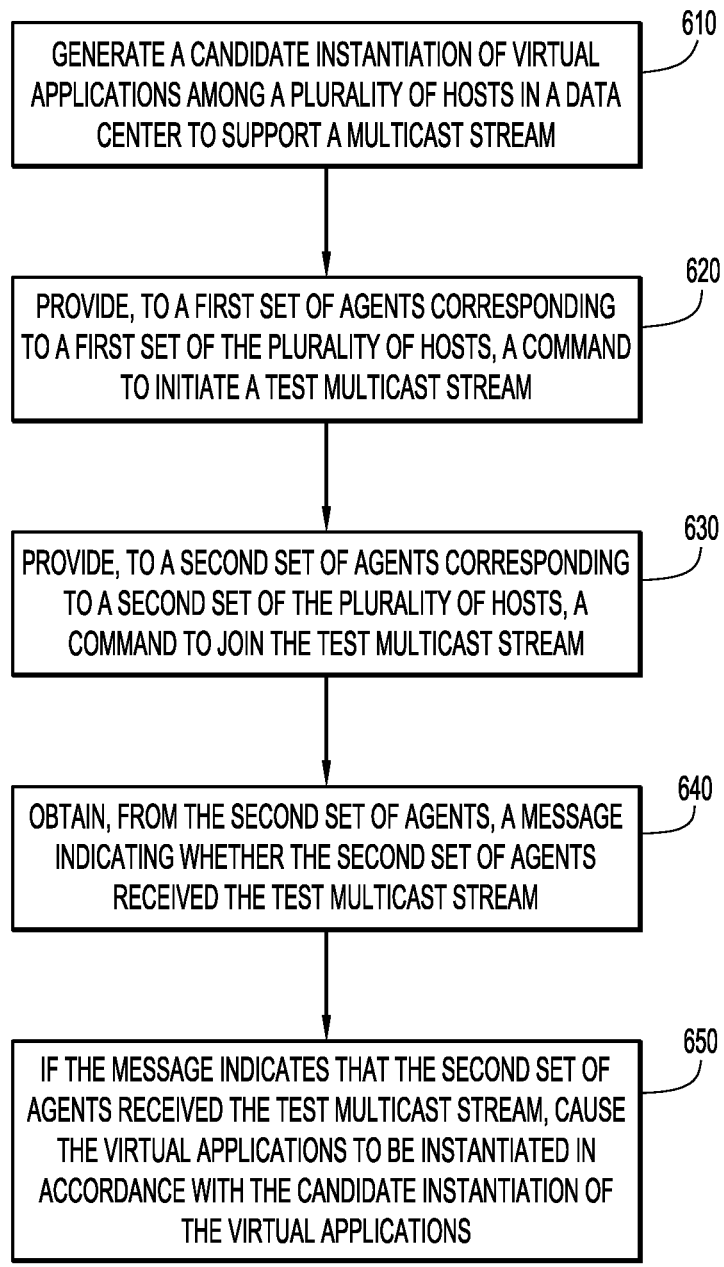
FIG. 6 is a flowchart of a method for scheduling multicast flows in a data center, according to an example embodiment.

FIG. 6 is a flowchart of a method 600 for scheduling multicast flows in a data center. Method 600 may be performed by a server (e.g., workload placement server 110). At 610, the server generates a candidate instantiation of virtual applications among a plurality of hosts in a data center to support a multicast stream. At 620, the server provides, to a first set of agents corresponding to a first set of the plurality of hosts, a command to initiate a test multicast stream. At 630, the server provides, to a second set of agents corresponding to a second set of the plurality of hosts, a command to join the test multicast stream. At 640, the server obtains, from the second set of agents, a message indicating whether the second set of agents received the test multicast stream. At 650, if the message indicates that the second set of agents received the test multicast stream, the server causes the virtual applications to be instantiated in accordance with the candidate instantiation of the virtual applications.

Techniques are described herein for placing virtualized applications as part of a professional media solution in a data center in order to meet the non-blocking, non-loss requirements for elephant multicast flows in the professional media industry. The workload placement of these virtualized functions is aided by hosted network agents to test placement decisions. The agents proxy for the virtual applications and physical appliances and emulate the establishment of elephant multicast trees during the placement process. Using agent-based network testing of placed workloads enables testing of availability of network capacity for deployments of virtualized (or partially virtualized) professional media solutions by a workload placement function/logic without actually creating and configuring the virtualized applications and physical appliances that make up the solution. The agents also allow for integration of workload placement functions for multicast elephant flow scheduling with decentralized professional media networks. Moreover, even if agent-based deployment cannot be realized altogether, the ToR/leaf switch may be manually and statically configured to establish a multicast tree, e.g., by way of the workload placement function itself.

Selecting compute hosts that are appropriate for virtualized professional media applications improves the schedulability of the associated elephant multicast flows when deployed as part of professional media solution. The collective load on the ToR (or EoR) switches, virtual switches, links, etc. for the selected data centers hosts may determine whether the elephant multicast flows can be served by those hosts in a given configuration. The network-based agents may assist in data center placement decisions for virtualized professional media applications specifically and complete professional media solutions generally. The agents may synthesize test multicast trees that are similar to those used by the professional media solution after deployment. Thus, efficient workload placement functionality is provided in lieu of a centralized SDN controller. It will be appreciated, however, that an SDN controller may be suitable for other purposes in a system employing the techniques described herein.

In one form, a method is provided. The method comprises: generating a candidate instantiation of virtual applications among a plurality of hosts in a data center to support a multicast stream; providing, to a first set of agents corresponding to a first set of the plurality of hosts, a command to initiate a test multicast stream; providing, to a second set of agents corresponding to a second set of the plurality of hosts, a command to join the test multicast stream; obtaining, from the second set of agents, a message indicating whether the second set of agents received the test multicast stream; and if the message indicates that the second set of agents received the test multicast stream, causing the virtual applications to be instantiated in accordance with the candidate instantiation of the virtual applications.

In one example, the method further comprises, if the message indicates that the second set of agents did not receive the test multicast stream, generating another candidate instantiation of virtual applications to support the multicast stream. In another example, the method further comprises providing, to the first set of agents, a command to stop the test multicast stream. At least one agent of the first set of agents and the second set of agents may be deployed on the plurality of hosts, on a top-of-rack switch of a rack housing at least one host of the plurality of hosts, on an end-of-row switch of a plurality of racks housing at least one host of the plurality of hosts, and/or on one or more in-band devices of one or more hosts of the plurality of hosts. In one specific example, multiple agents of the first set of agents or the second set of agents are deployed on respective in-band devices of a single host of the one or more hosts. The first set of agents may initiate the test multicast stream via a port that is unique to the test multicast stream. The multicast stream may include video or audio data.

In another form, an apparatus is provided. The apparatus comprises: a network interface configured to send and/or receive messages; and one or more processors coupled to the network interface, wherein the one or more processors are configured to: generate a candidate instantiation of virtual applications among a plurality of hosts in a data center to support a multicast stream; provide, to a first set of agents corresponding to a first set of the plurality of hosts, a command to initiate a test multicast stream; provide, to a second set of agents corresponding to a second set of the plurality of hosts, a command to join the test multicast stream; obtain, from the second set of agents, a message indicating whether the second set of agents received the test multicast stream; and if the message indicates that the second set of agents received the test multicast stream, cause the virtual applications to be instantiated in accordance with the candidate instantiation of the virtual applications.

In another form, one or more non-transitory computer readable storage media are provided. The non-transitory computer readable storage media are encoded with instructions that, when executed by a processor, cause the processor to: generate a candidate instantiation of virtual applications among a plurality of hosts in a data center to support a multicast stream; provide, to a first set of agents corresponding to a first set of the plurality of hosts, a command to initiate a test multicast stream; provide, to a second set of agents corresponding to a second set of the plurality of hosts, a command to join the test multicast stream; obtain, from the second set of agents, a message indicating whether the second set of agents received the test multicast stream; and if the message indicates that the second set of agents received the test multicast stream, cause the virtual applications to be instantiated in accordance with the candidate instantiation of the virtual applications.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   generating a candidate instantiation of virtual applications among a plurality of hosts in a data center to support a multicast stream;
   providing, to a first set of agents corresponding to a first set of the plurality of hosts, a command to initiate a test multicast stream;
   providing, to a second set of agents corresponding to a second set of the plurality of hosts, a command to join the test multicast stream;
   obtaining, from the second set of agents, a message indicating whether the second set of agents received the test multicast stream; and
   if the message indicates that the second set of agents received the test multicast stream, causing the virtual applications to be instantiated in accordance with the candidate instantiation of the virtual applications.

2. The method of claim 1, wherein at least one agent of the first set of agents and the second set of agents is deployed on the plurality of hosts.

3. The method of claim 1, wherein at least one agent of the first set of agents and the second set of agents is deployed on a top-of-rack switch of a rack housing at least one host of the plurality of hosts.

4. The method of claim 1, wherein at least one agent of the first set of agents and the second set of agents is deployed on an end-of-row switch of a plurality of racks housing at least one host of the plurality of hosts.

5. The method of claim 1, wherein at least one agent of the first set of agents and the second set of agents is deployed on one or more in-band devices of one or more hosts of the plurality of hosts.

6. The method of claim 5, wherein multiple agents of the first set of agents or the second set of agents are deployed on respective in-band devices of a single host of the one or more hosts.

7. The method of claim 1, wherein the first set of agents initiates the test multicast stream via a port that is unique to the test multicast stream.

8. The method of claim 1, further comprising:
   if the message indicates that the second set of agents did not receive the test multicast stream, generating another candidate instantiation of virtual applications to support the multicast stream.

9. The method of claim 1, further comprising:
   providing, to the first set of agents, a command to stop the test multicast stream.

10. The method of claim 1, wherein the multicast stream includes video or audio data.

11. An apparatus comprising:
    a network interface configured to send and/or receive messages; and
    one or more processors coupled to the network interface, wherein the one or more processors are configured to:
      generate a candidate instantiation of virtual applications among a plurality of hosts in a data center to support a multicast stream;
      provide, to a first set of agents corresponding to a first set of the plurality of hosts, a command to initiate a test multicast stream;
      provide, to a second set of agents corresponding to a second set of the plurality of hosts, a command to join the test multicast stream;

obtain, from the second set of agents, a message indicating whether the second set of agents received the test multicast stream; and if the message indicates that the second set of agents received the test multicast stream, cause the virtual applications to be instantiated in accordance with the candidate instantiation of the virtual applications.

12. The apparatus of claim 11, wherein at least one agent of the first set of agents and the second set of agents is deployed on the plurality of hosts.

13. The apparatus of claim 11, wherein at least one agent of the first set of agents and the second set of agents is deployed on a top-of-rack switch of a rack housing at least one host of the plurality of hosts.

14. The apparatus of claim 11, wherein at least one agent of the first set of agents and the second set of agents is deployed on an end-of-row switch of a plurality of racks housing at least one host of the plurality of hosts.

15. The apparatus of claim 11, wherein at least one agent of the first set of agents and the second set of agents is deployed on one or more in-band devices of one or more hosts of the plurality of hosts.

16. One or more non-transitory computer readable storage media encoded with instructions that, when executed by a processor, cause the processor to:

generate a candidate instantiation of virtual applications among a plurality of hosts in a data center to support a multicast stream;

provide, to a first set of agents corresponding to a first set of the plurality of hosts, a command to initiate a test multicast stream;

provide, to a second set of agents corresponding to a second set of the plurality of hosts, a command to join the test multicast stream;

obtain, from the second set of agents, a message indicating whether the second set of agents received the test multicast stream; and if the message indicates that the second set of agents received the test multicast stream, cause the virtual applications to be instantiated in accordance with the candidate instantiation of the virtual applications.

17. The one or more non-transitory computer readable storage media of claim 16, wherein at least one agent of the first set of agents and the second set of agents is deployed on the plurality of hosts.

18. The one or more non-transitory computer readable storage media of claim 16, wherein at least one agent of the first set of agents and the second set of agents is deployed on a top-of-rack switch of a rack housing at least one host of the plurality of hosts.

19. The one or more non-transitory computer readable storage media of claim 16, wherein at least one agent of the first set of agents and the second set of agents is deployed on an end-of-row switch of a plurality of racks housing at least one host of the plurality of hosts.

20. The one or more non-transitory computer readable storage media of claim 16, wherein at least one agent of the first set of agents and the second set of agents is deployed on one or more in-band devices of one or more hosts of the plurality of hosts.

* * * * *